Feb. 12, 1929.
R. OLIVER ET AL
SCREEN FOR THE PROJECTION OF MOVING PICTURES,
LANTERN SLIDES, OR THE LIKE
Filed July 15, 1926
1,701,590
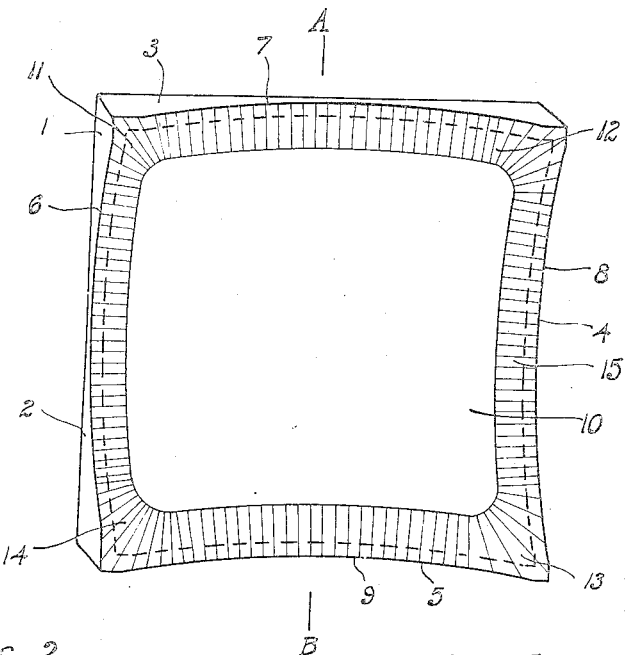
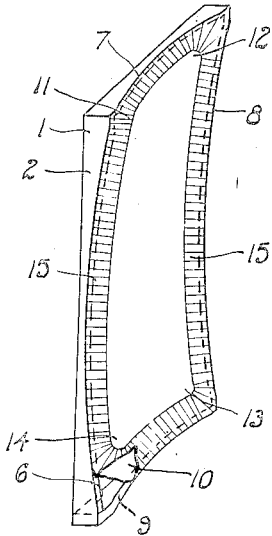
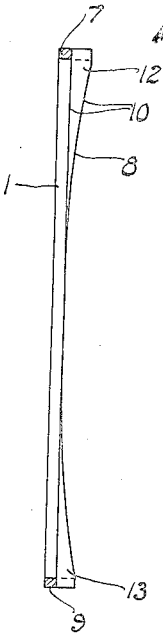
R. Oliver &
F. W. Gooch
INVENTORS
By: Marks & Clerk
Attys.

Patented Feb. 12, 1929.

1,701,590

UNITED STATES PATENT OFFICE.

ROBERT OLIVER AND FREDERICK WALTER GOOCH, OF AUCKLAND, NEW ZEALAND.

SCREEN FOR THE PROJECTION OF MOVING PICTURES, LANTERN SLIDES, OR THE LIKE.

Application filed July 15, 1926, Serial No. 122,658, and in New Zealand February 13, 1926.

This invention relates to an improved screen which while particularly applicable for moving picture projection is also applicable for the projection of lantern or other slides.

With flat screens as used at present the clearest portion of the picture projected on the canvas is in a central circle.

The portion of the picture projected towards the corners of the canvas tends in most cases to be blurred and indistinct, because the focusing of the projector or camera is set for the central portion of the screen and to reach the corners thereof, the light rays have to travel a further distance of usually some feet. Consequently the portion of the picture at or towards the camera must with the screens at present in use by always more or less out of focus.

Furthermore for clearest projection and minimum of distortion the rays of light should strike the canvas at right angles thereto, the more acuate the angle the greater the distortion.

In this invention the above disadvantages are eliminated or minimized and to synchronize the focus at or towards the corners of the canvas with that at the central portion, the corners are forwardly curved so that the whole screen is in focus, the light rays having substantially the same distance to travel from the projector to all parts of the canvas.

The screen is thus made substantially concave in shape and the rays of light from the projector strike all portions of the canvas substantially at right angles thereby minimizing distortion and increasing strength of light at the corners and the upper and lower portions of the canvas.

Referring now to the accompanying drawings which illustrate a constructional embodiment of the principle underlying this invention, Figure 1 is a perspective view of the invention, Figure 2 is a side perspective view of the invention with a corner of the canvas or the like sheet turned back to show the under frame, and Figure 3 is a sectional view on line A—B of Figure 1.

A preferably rectangular frame 1 of any suitable material has its four sides 2, 3, 4 and 5 with their front faces 6, 7, 8 and 9 cut concave and with a radius equal to the distance from the cinema projector.

The usual canvas or other suitable sheet 10 is stretched between the front concave faces 6, 7, 8 and 9 and suitably fastened thereto in such a manner that it follows the concave shape of the faces 6, 7, 8 and 9 being then practically flat in the middle and also at the centre of the sides 2, 3, 4 and 5 and gradually outwardly projecting from the middle to the corners 11, 12, 13 and 14.

Thus the raised corners 11, 12, 13, and 14 bring all portions of the screen 10 within a comparatively even distance of the cinema projector.

By reason of the particular manner in which the side bars of the framework are concaved for producing raised flat corners a clearer outline of the picture projected thereon is produced which enables the same to be clearly seen in close proximity to the screen.

The usual black surrounding border 15 to the canvas 10 is provided and the frame 1 may have its sides 2, 3, 4 and 5 provided with known suitable means to hold it square such as stays, tie-rods, racking braces or the like (not shown).

Claim:

A screen for the projection thereon of pictures and the like comprising a rectangular supporting framework composed of a plurality of interconnected side bars, the front faces of which are concaved to points short of the ends thereof leaving raised flat corners, a sheet of canvas stretched across the frame and secured to the concaved faces and raised corners of the bars, and a border surrounding the canvas and secured thereto so as to overlie the curved edges and flat corners of the bars, substantially as and for the purposes set forth.

In testimony whereof we affix our signatures.

ROBERT OLIVER.
FREDERICK WALTER GOOCH.